US012489234B2

(12) United States Patent
Tsai (10) Patent No.: US 12,489,234 B2
(45) Date of Patent: Dec. 2, 2025

(54) ELECTRICAL CONNECTOR ASSEMBLY WITH A BAFFLE CONNECTED TO A CONNECTOR AND AN ELECTRONIC DEVICE USING THE SAME

(71) Applicant: WISTRON CORP., New Taipei (TW)

(72) Inventor: Wan Lo Tsai, New Taipei (TW)

(73) Assignee: WISTRON CORP., New Taipei (TW)

( * ) Notice: Subject to any disclaimer, the term of this patent is extended or adjusted under 35 U.S.C. 154(b) by 468 days.

(21) Appl. No.: 18/048,068

(22) Filed: Oct. 20, 2022

(65) Prior Publication Data

US 2024/0039196 A1 Feb. 1, 2024

(30) Foreign Application Priority Data

Jul. 27, 2022 (TW) .................................. 111128126

(51) Int. Cl.
*H01R 12/73* (2011.01)
*G06F 1/20* (2006.01)
(Continued)

(52) U.S. Cl.
CPC ............... *H01R 12/73* (2013.01); *G06F 1/20* (2013.01); *H01R 12/712* (2013.01); *H01R 13/506* (2013.01); *H01R 13/6273* (2013.01); *H01R 13/6275* (2013.01); *H01R 13/629* (2013.01); *H05K 7/1418* (2013.01); *H01R 12/70* (2013.01); *H01R 12/7005* (2013.01); *H01R 12/71* (2013.01); *H01R 12/716* (2013.01); *H01R 12/72* (2013.01); *H01R 12/721* (2013.01);
(Continued)

(58) Field of Classification Search
CPC .... H01R 12/73; H01R 12/712; H01R 13/506; H01R 13/6273; H01R 13/6275; H01R 13/629; H01R 12/70; H01R 12/7005; H01R 12/71; H01R 12/716; H01R 12/72; H01R 12/721; H01R 12/737; H01R 13/502; H01R 13/627; H01R 13/6271; G06F 1/20; H05K 7/1418; H05K 7/20145
See application file for complete search history.

(56) References Cited

U.S. PATENT DOCUMENTS 5,281,161 A * 1/1994 Kanai .................. H01R 12/716
439/701

FOREIGN PATENT DOCUMENTS

TW M379311 U * 4/2010
TW M379311 U1 * 4/2010
(Continued)

OTHER PUBLICATIONS

Translation of TWM379311U (Year: 2010).*
TW Office Action dated Aug. 28, 2023 in Taiwan application No. 111128126.

*Primary Examiner* — Justin M Kratt
(74) *Attorney, Agent, or Firm* — McClure, Qualey & Rodack, LLP (57) ABSTRACT

A connector assembly includes a connector and a baffle, the connector includes a base part, two latches, and a first engagement structure, the two latches are respectively disposed at two opposite ends of the base part, and the first engagement structure extends outwardly from the base part, the baffle includes a main portion and a second engagement structure connected to the main portion, the first engagement structure is selectively connected to the second engagement structure for the baffle to be fixed on the connector.

20 Claims, 11 Drawing Sheets (51) Int. Cl.
  *H01R 12/71*    (2011.01)
  *H01R 13/506*   (2006.01)
  *H01R 13/627*   (2006.01)
  *H01R 13/629*   (2006.01)
  *H05K 7/14*     (2006.01)
  *H01R 12/70*    (2011.01)
  *H01R 12/72*    (2011.01)
  *H01R 13/502*   (2006.01)
  *H05K 7/20*     (2006.01)

(52) U.S. Cl.
  CPC .......... *H01R 12/737* (2013.01); *H01R 13/502* (2013.01); *H01R 13/627* (2013.01); *H01R 13/6271* (2013.01); *H05K 7/20145* (2013.01)

(56) References Cited

FOREIGN PATENT DOCUMENTS

| TW | M495018 U | 2/2015 |
| TW | I600214 B | 9/2017 |

\* cited by examiner

ELECTRICAL CONNECTOR ASSEMBLY WITH A BAFFLE CONNECTED TO A CONNECTOR AND AN ELECTRONIC DEVICE USING THE SAME

CROSS-REFERENCE TO RELATED APPLICATIONS

This non-provisional application claims priority under 35 U.S.C. § 119(a) on Patent Application No(s). 111128126 filed in Taiwan (R.O.C.) on Jul. 27, 2022, the entire contents of which are hereby incorporated by reference.

TECHNICAL FIELD

The disclosure relates to a baffle, more particularly relates to a connector assembly a baffle and an electronic device including the connector assembly.

BACKGROUND

Generally, various forms of slots are provided in server for the facilitation of installation of various required expansion cards. Taking a DIMM (dual in-line memory module) card as an example, a circuit board in server may have an array of slots thereon for the insertion of one or more DIMM cards, such that an arrangement of DIMM cards can be installed in a specific area in the server.

With the trend of compact internal arrangement, the nearby electrical/non-electrical components (e.g., cable) are arranged close to the DIMM cards. To protect the DIMM cards from contacting or being hit by these components, a plate cover is provided next to the DIMM card. However, conventionally, the plate cover is fixed to the circuit board via bolts or screws, such that the installation and removal of the plate cover involve the troublesome process implemented by using an additional hand tool. Also, the circuit board is needed to additionally form mount holes for the fixture of the plate cover and therefore limits the available area on the circuit board for circuits and traces.

SUMMARY

Accordingly, one aspect of the disclosure is to provide a connector assembly and an electronic device including the same which are capable of solving the aforementioned problems caused by the conventional plate cover.

One embodiment of the disclosure provides a connector assembly including a connector and a baffle, the connector includes a base part, two latches, and a first engagement structure, the two latches are respectively disposed at two opposite ends of the base part, and the first engagement structure extends outwardly from the base part, the baffle includes a main portion and a second engagement structure connected to the main portion, the first engagement structure is selectively connected to the second engagement structure, when the first engagement structure is connected to the second engagement structure, the baffle is fixed on the connector.

Another embodiment of the disclosure provides an electronic device including a device casing, a circuit board, and a connector assembly, the circuit board is accommodated in the device casing, the connector assembly includes a connector and a baffle, the connector includes a base part, two latches, and a first engagement structure, the base part is disposed on the circuit board, the two latches are respectively disposed at two opposite ends of the base part, and the first engagement structure extends outward from the base part, the baffle includes a main portion and a second engagement structure connected to the main portion, the first engagement structure is selectively connected to the second engagement structure, when the first engagement structure is connected to the second engagement structure, the baffle is fixed on the connector.

According to the connector assembly and the electronic device as discussed in the above embodiments of the disclosure, the first engagement structure on the connector of the connector assembly is selectively engaged with the second engagement structure of the baffle, thus the installation of the baffle can be achieved simply by placing the baffle onto the connector without additional hand tool and thereby improving the assembling efficiency.

Also, the connector of the connector assembly of the disclosure not only can secure the expansion card but also can secure the baffle, that is, the baffle is installed on the connector, such that the installation of the baffle of the disclosure can be achieved without relying on mount holes on the circuit board; in other words, the circuit board has no need to have additional mount holes for the connector assembly of the disclosure and thereby avoids limiting the available area on the circuit board for circuits and traces.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities. Unless specified or limited otherwise, the terms "mounted", "connected", "disposed", "fixed", and variations thereof are used broadly and encompass both direct and indirect mounting, connection, disposing, and fixing.

Figure 1:
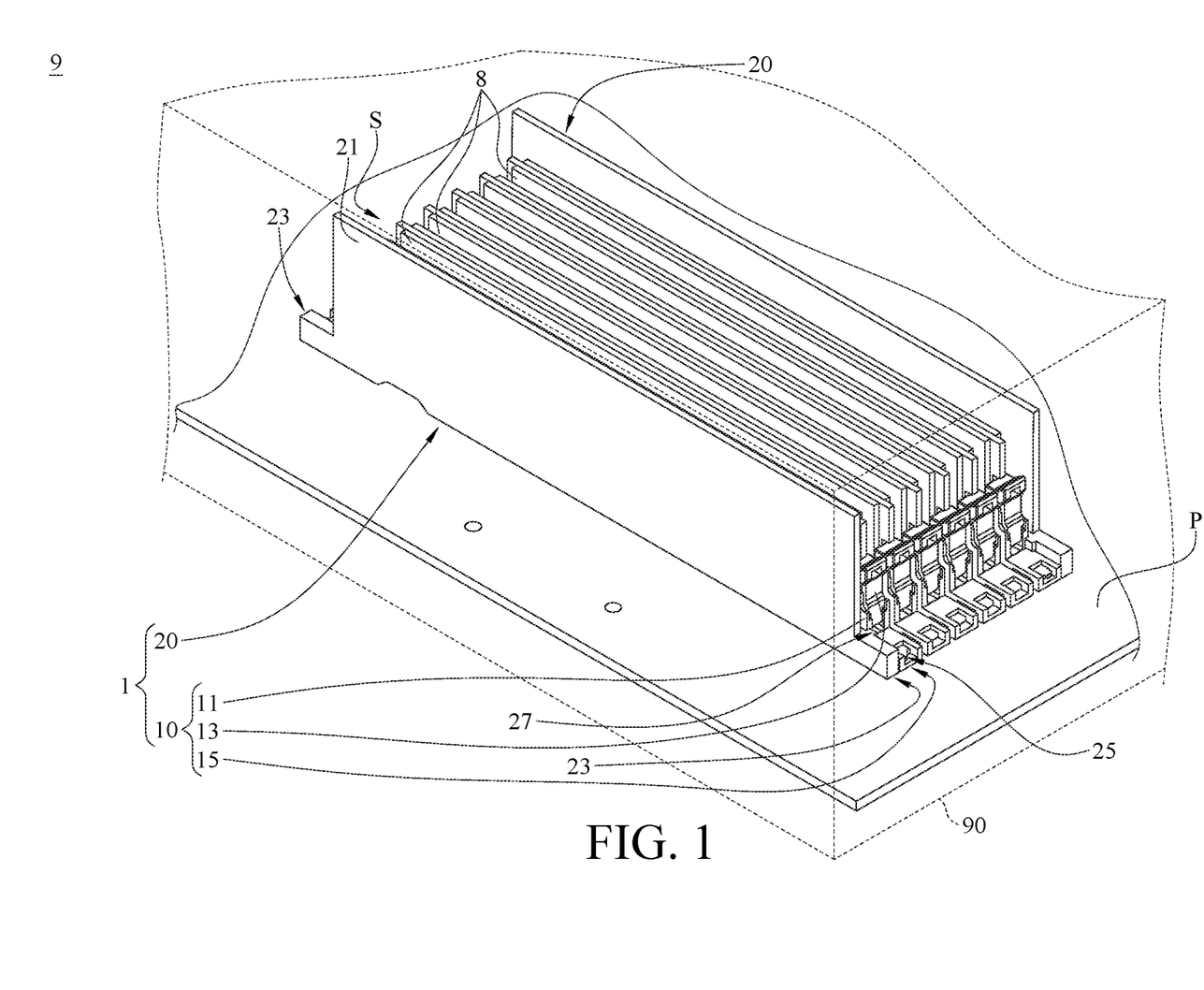
FIGS. 1-2 are perspective views of a connector assembly according to one embodiment of the disclosure and an electronic device including the same.
Figure 2:
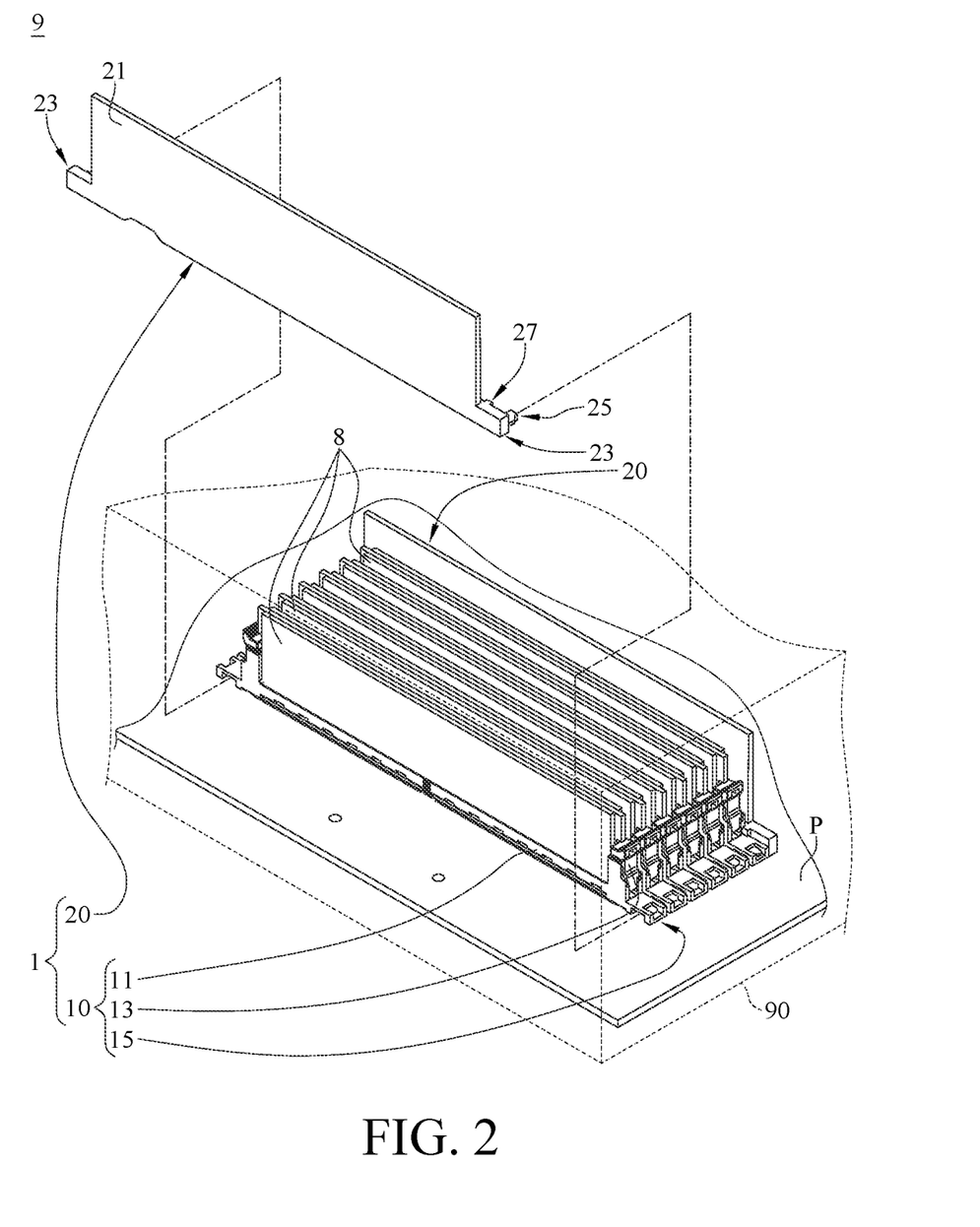

Referring to FIG. 1, one embodiment of the disclosure provides an electronic device 9, the electronic device 9 may be, but is not limited to, a computer host, a server, or a part thereof, the electronic device 9 may include a device casing 90 configured for accommodating any required electrical/non-electrical component, assembly, or module. For example, the device casing 90 may accommodate one or more connector assemblies 1 and a circuit board P. The circuit board P may be directly or indirectly arranged at any selected side or area of the device casing 90. The connector assembly 1 may be arranged on the circuit board P; in other words, the connector assembly 1 may be arranged to the predetermined area in the device casing 90 by being arranged on the circuit board P. It is noted that the quantity of the connector assemblies 1 on the circuit board P may be decreased or increased as required, and the arrangement of the connector assemblies 1 and intervals therebetween are both allowed to be modified as required.

In addition, the connector assembly 1 enables the installation of an expansion card 8 so as to realize the electrical connection between the expansion card 8 and the circuit board P. As shown, when the expansion card 8 is plugged into the connector assembly 1, the expansion card 8 is electrically connected to the circuit board P via the connector assembly 1. The expansion card 8 may be, but is not limited to, any electronic component that is suitable to be inserted into the connector assembly 1 so as to be installed onto the circuit board P to selectively add required functions to the electronic device 9. For example, the expansion card 8 may be a DIMM (dual in-line memory module) card.

It is noted that the device casing 90, the circuit board P, and the expansion card 8 are provided for better understanding the connector assembly 1 but not intended to limit the disclosure. The detail of the connector assembly 1 will be provided below with further reference to FIGS. 3-5.

Figure 3:
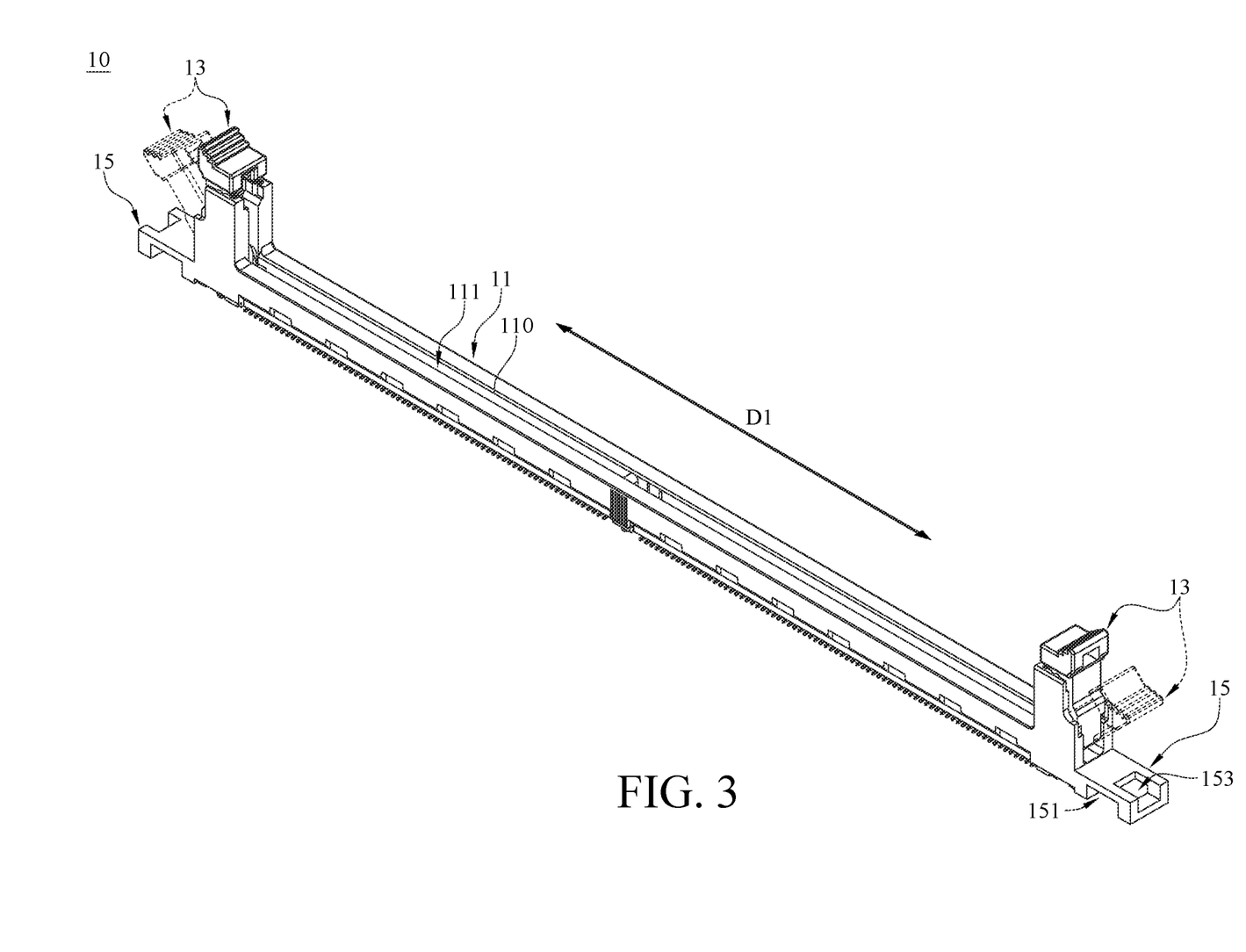
FIG. 3 is a perspective view of a connector of a connector assembly according to one embodiment of the disclosure.
Figure 4:
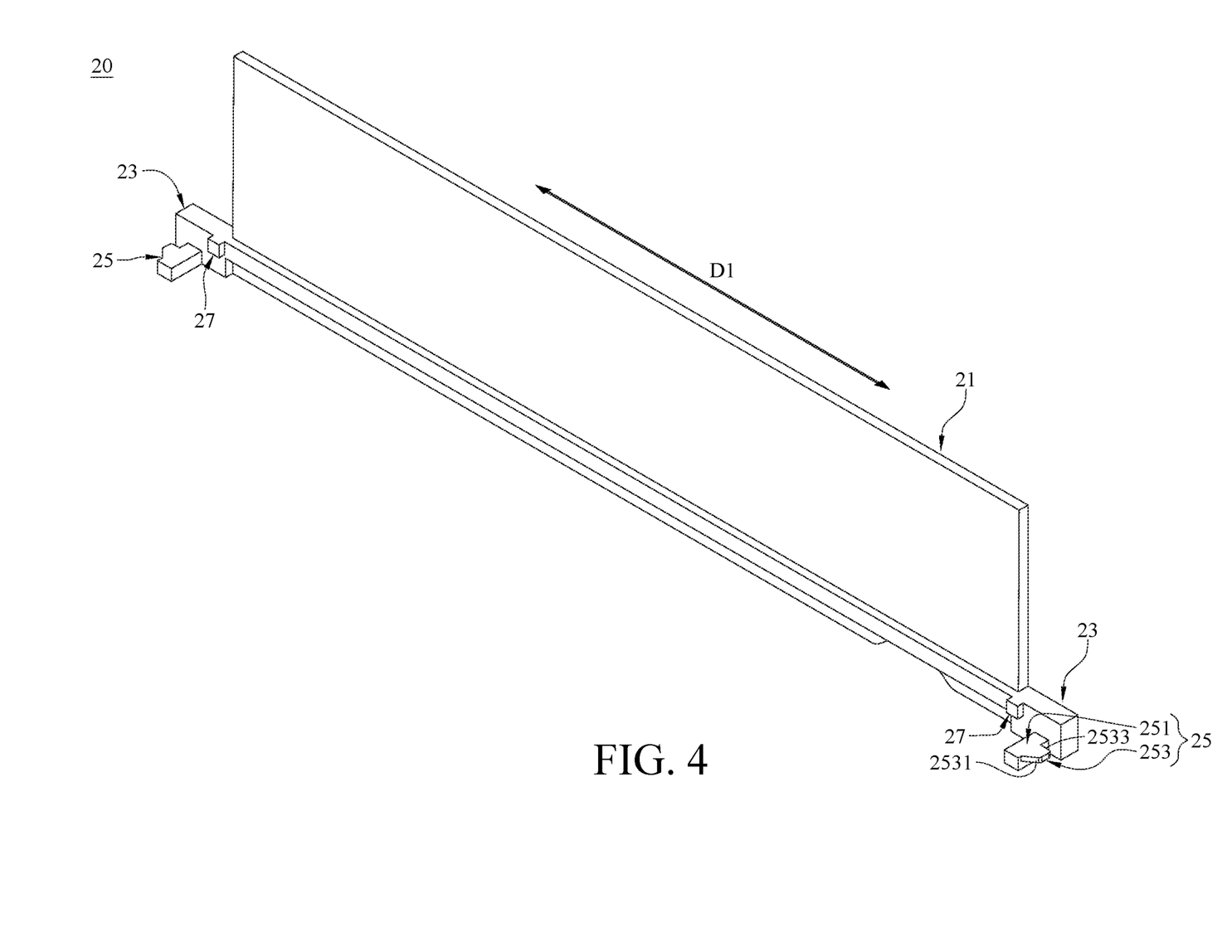
FIG. 4 is a perspective view of a baffle of a connector assembly according to one embodiment of the disclosure.
Figure 5:
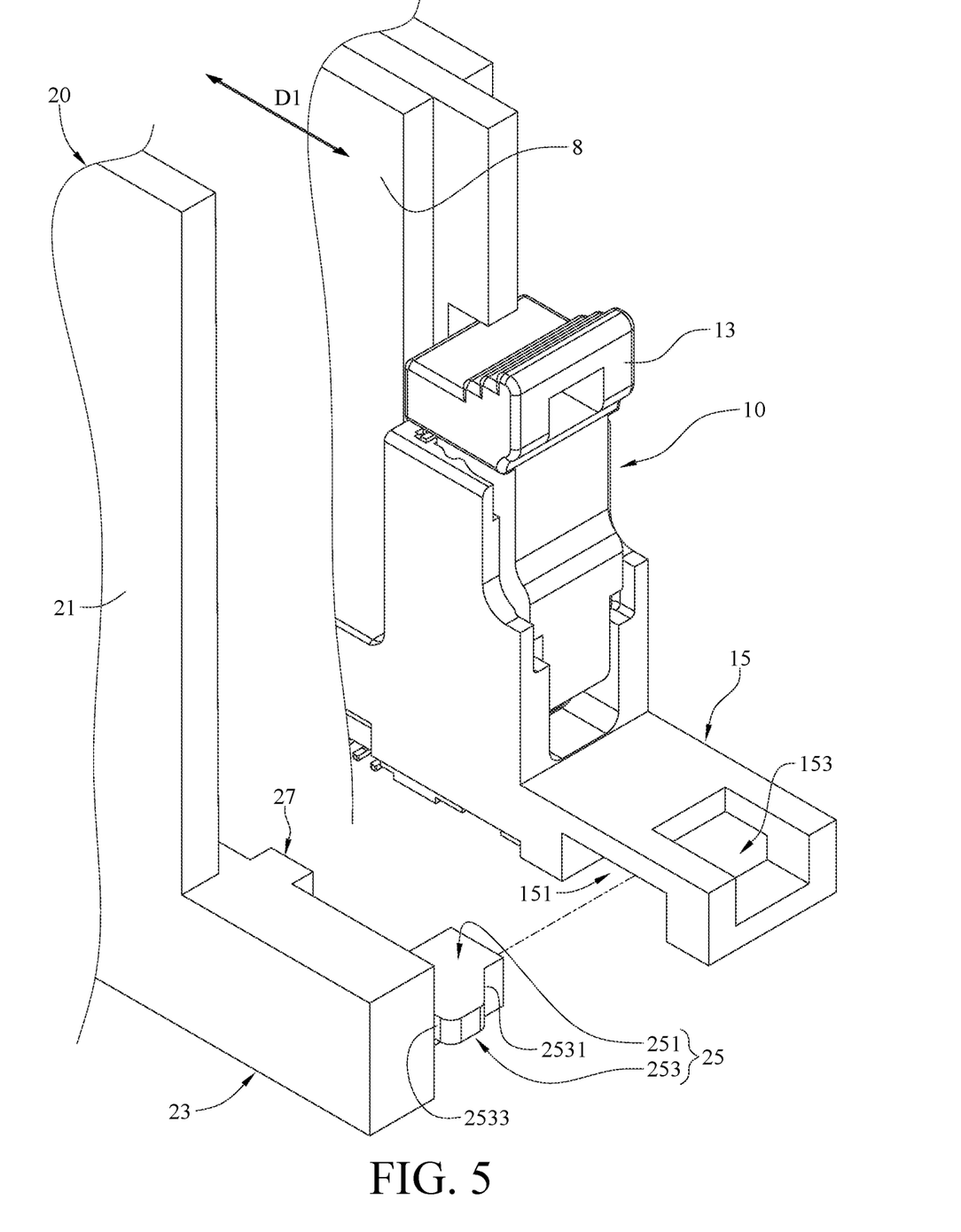
FIG. 5 depicts the connection between the baffle and the connector according to one embodiment of the disclosure.

In this embodiment, each of the connector assemblies 1 may include a connector and a baffle 20. The connector 10 may be disposed on the circuit board P by any suitable manner. The connector 10 is provided for electrically connecting to the expansion card 8. The baffle 20 may be detachably disposed on the connector 10. For example, it is selectively to arrange two baffles 20 respectively at two of the connector 10 that are located outermost, such that the baffles 20 may define an air channel S therebetween to facilitate cooling air (not shown) to pass through the expansion cards 8 between the baffle 20 and thereby improving heat dissipation for the expansion cards 8. Also, arranging the baffle 20 at the outermost expansion card 8 is able to protect the array of the expansion cards 8 from being hit by nearby electrical/non-electrical component (e.g., cable), that is, the baffle 20 is able to protect the expansion cards 8 from being damaged due to nearby object.

In this embodiment, the connector 10 may include a base part 11, two latches 13, and at least one first engagement structure 15. The base part 11 means the part of the connector 10 used to be fixed to the circuit board P and having a slot 111 for receiving the expansion card 8. The base part 11 may be fixed to the circuit board P by any suitable manner. There are terminals (not numbered) arranged in the slot 111 of the base part 11 for electrically connecting the terminals (not numbered) of the expansion card 8. The base part 11 may be in a U shape and therefore is suitable for receiving and guiding the insertion of the expansion card 8. Herein, an extension direction D1 being substantially parallel to a long side 110 of the slot 111 of the base part 11 is defined. As shown, the lone side 110 of the slot 111 of the base part 11 is substantially parallel to the extension direction D1, thus, D1 may be considered as a direction parallel to the slot 111 or considered as an extension direction of the slot 111.

The latches 13 mean the parts on the connector 10 for securing the position of the expansion card 8. As shown, the latches 13 are respectively disposed at two opposite ends of the base part 11. For example, the latches 13 may be respectively pivotably connected to two opposite ends of the base part 11 and therefore each of them is switchable between a latching position (e.g., the latch 13 in solid lines as shown in FIG. 3) and a released position (e.g., the latch 13 in dashed lines as shown in FIG. 3). When the expansion card 8 is inserted into the slot 111 of the base part 11, the latch 13 may be switched to the latching position to secure the expansion card 8 in the current position. When the latch 13 is switched to the released position, the expansion card 8 is released from the latch 13 and therefore is allowed to be removed from the slot 111 of the base part 11.

It is noted that any suitable means that can selectively hold the expansion card 8 in position on the base part 11 can be employed as the latch of the disclosure. For example, in some other embodiments, the latch may be an elastic structure integrally protruding outwardly from the base part; in this case, the latch in the latching position is able to fix the expansion card and able to be switched to the released position to release the expansion card when being deformed.

The first engagement structures 15 may extend outwardly respectively from two opposite ends of the base part 11. On each ends of the base part 11, the first engagement structure 15 is located between the latch 13 and the circuit board P. In specific, the first engagement structures 15 may extend outwardly respectively from two opposite ends of the base part 11 along the extension direction D1. Also, the first engagement structures 15 may be spaced apart from the latches 13, and the motion of the latched 13 will not interfere with the first engagement structures 15. That is, the first engagement structure 15 does not interfere with the latch 13 whether the latch 13 is in latching position or released position. In one embodiment, the first engagement structure 15 may be integrally formed with the base part 11. In some other embodiments, the first engagement structure 15 may be additionally fixed to the base part 11 by any suitable manner.

The first engagement structure 15 means the part of the connector 10 used for the installation of the baffle 20 onto the connector 10. Specifically, the first engagement structure 15 may include a receiving portion 151 and a first engagement portion 153, the receiving portion 151 and the first engagement portion 153 may be respectively located at different sides of the first engagement structure 15, the receiving portion 151 may be, but is not limited to, a through hole or a blind hole. The first engagement portion 153 may be a hole capable of exposing the receiving portion 151. Thus, the receiving portion 151 and the first engagement portion 153 are connected to each other. The receiving portion 151 is configured for receiving respective engagement structure of the baffle 20 (e.g., a second engagement structure 25 described in later paragraph) so as to secure the position of the baffle 20 relative to the connector 10.

The baffle 20 may be made of any suitable material. In this embodiment, the baffle 20 may include a main portion 21, at least one extension portion 23, and at least one second engagement structure 25. The main portion 21 means the part of the baffle 20 configured to cover and protect a side of the expansion card 8. When the baffle 20 is installed on the connector 10, the main portion 21 of the baffle 20 may stand at a side of the connector 10 and protrudes further from the circuit board P than the connector 10. In one embodiment, the baffle 20 may be a flat plate. In some other embodiments, the baffle may be shaped or sized as required.

The second engagement structure 25 may be connected to an end of the main portion 21. The second engagement structure 25 means the part of the baffle 20 configured to be engageable with the first engagement structure 15 of the connector 10. For example, the second engagement structure 25 may be connected to an end of the main portion 21 via the extension portion 23. The extension portions 23 mean the parts of the baffle 20 that extend outwardly from the main portion 21. In some embodiments, the extension portion 23 may extend outwardly from the main portion 21 along the extension direction D1 which is substantially parallel to the slot 111. The second engagement structure 25 may protrude from a side (or, surface) of the extension portion 23 facing the connector 10.

In this embodiment, the second engagement structure 25 may include a first connection portion 251 and a second engagement portion 253. The first connection portion 251 may extend toward the first engagement structure 15 of the connector 10 from the extension portion 23. In specific, the first connection portion 251 may extend toward the first engagement structure 15 from a side (or, surface) of the extension portion 23 facing the first engagement structure 15 of the connector 10 along a direction substantially perpendicular to the extension direction D1 (or, the slot 111); that is, the first connection portion 251 may extend toward the connector 10 from the extension portion 23.

The second engagement portion 253 may be connected to the extension portion 23 via the first connection portion 251. As shown, the second engagement portion 253 may protrude from a side (or, surface) of the first connection portion 251 located away from the main portion 20 and therefore may be perpendicular to the first connection portion 251. For example, the second engagement portion 253 may extend outwardly from a side (or, surface) of the first connection portion 251 located away from the main portion 21 along a direction substantially parallel to the extension direction D1 of the slot 111.

The second engagement portion 253 and part of the first connection portion 251 may be inserted into the receiving portion 151 of the first engagement structure 15 to make the second engagement portion 253 engage with the first engagement portion 153 of the first engagement structure 15. In this embodiment, the second engagement portion 253 may have a shape tapered in a direction away from the main portion 20 from a side (or, surface) of the first connection portion 251 located away from the main portion 20, thus the second engagement portion 253 may include an inclined push surface 2531 and an engaging surface 2533. The inclined push surface 2531 may be inclined relative to the extension direction D1 of the slot 111 and therefore facilitates the insertion of the engagement portion 253 into the receiving portion 151. The engaging surface 2533 may be substantially parallel to the extension direction D1 of the slot 111 and is configured to be engaged with the inner wall of the first engagement portion 153 when the second engagement portion 253 is inserted into the first engagement portion 153 so as to make the second engagement portion 253 engage with the first engagement structure 15.

Figure 6:
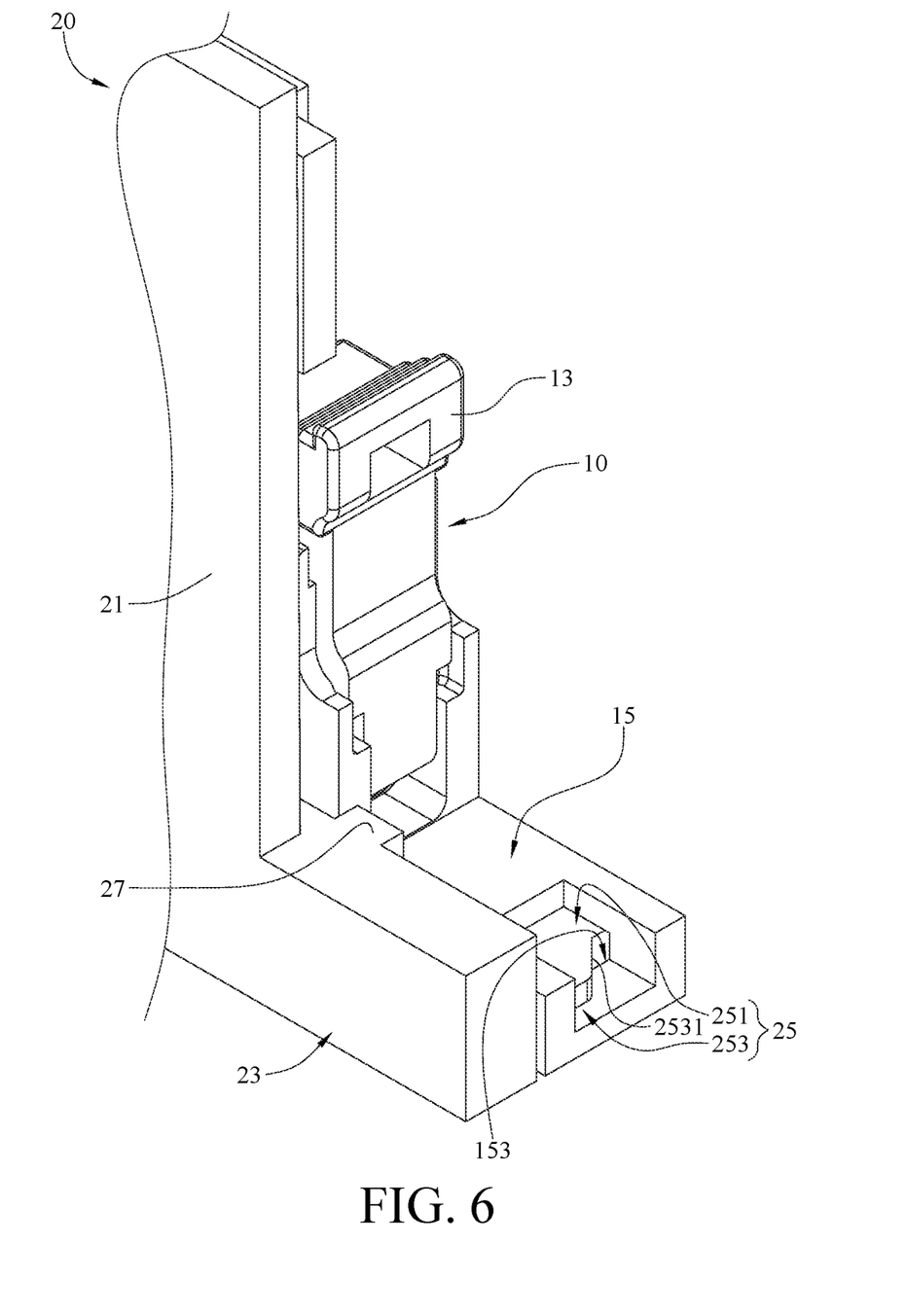
FIG. 6 is a partially enlarged view showing that the baffle is installed on the connector.
Figure 7:
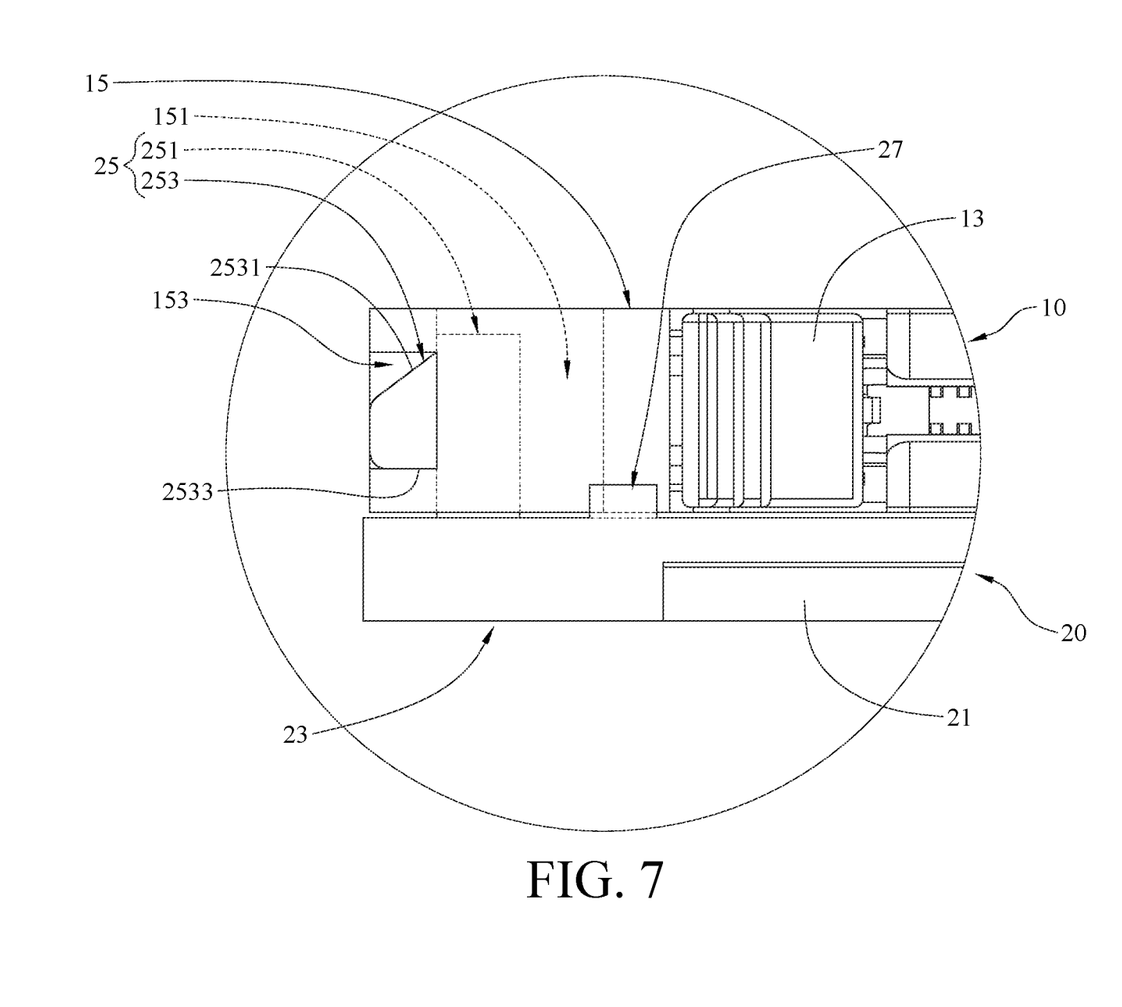
FIG. 7 is a partially enlarged top view of FIG. 6.
Figure 8:
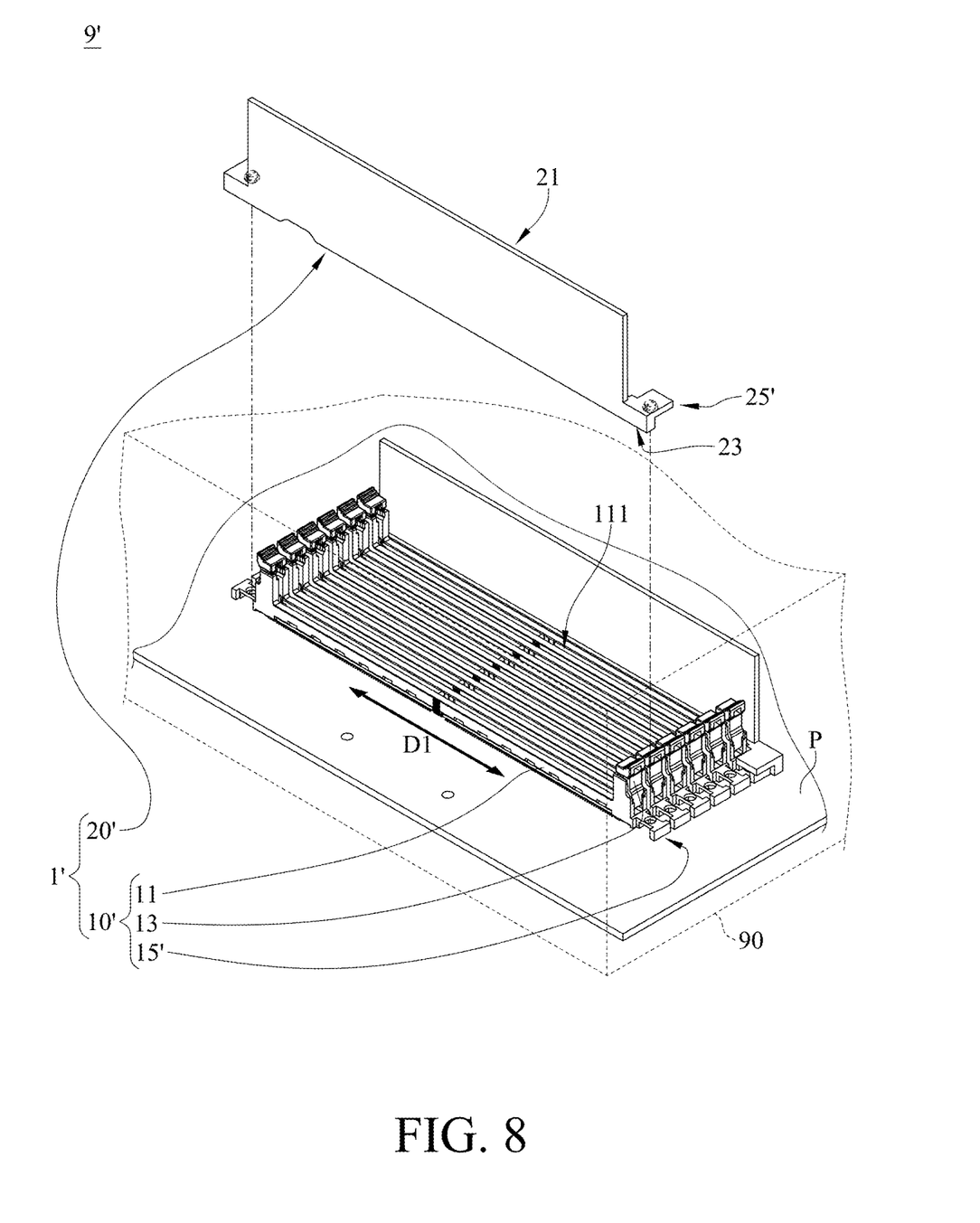
FIG. 8 is a perspective view of a connector assembly according to another embodiment of the disclosure and an electronic device including the same.
Figure 9:
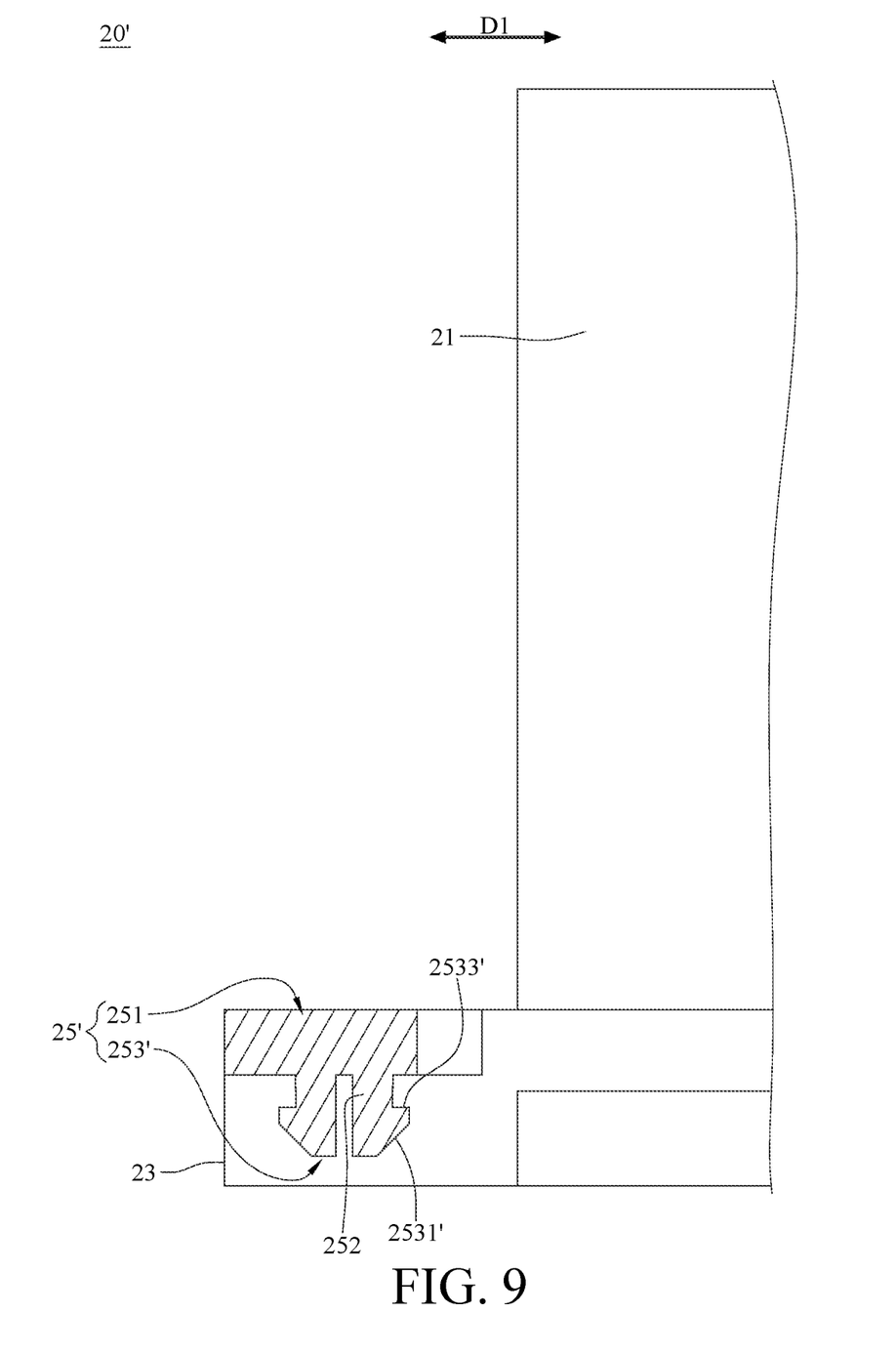
FIG. 9 is a partially enlarged view of a baffle of a connector assembly according to another embodiment of the disclosure.

Then, how the baffle 20 is installed onto the connector 10 will be described in detail with reference to FIGS. 1 and 5 and further reference to FIGS. 6-7. To do so, the baffle 20 can be moved toward the connector 10 so as to make the first engagement structure 15 of the connector 10 engage with the second engagement structure 25 of the baffle 20. In specific, to move the extension portion 23 of the baffle 20 toward the connector in a direction substantially perpendicular to the extension direction D1 of the slot 111, the second engagement structure 25 of the baffle 20 can be inserted into the receiving portion 151 on the first engagement structure 15 of the connector 10. During the insertion of the second engagement structure 25 into the receiving portion 151, the inclined push surface 2531 of the second engagement portion 253 firstly contacts the inner wall of the receiving portion 151 to facilitate and guide the second engagement portion 253 to enter the receiving portion 151, and then the first connection portion 251 experience elastic deformation by the inner wall of the receiving portion 151. When the engaging surface 2533 of the second engagement portion 253 reaches the first engagement portion 153, the first connection portion 251 restores to its original shape and therefore makes the engaging surface 2533 engage with the inner wall of the first engagement portion 153, such that the second engagement structure 25 is retained at the first engagement structure 15 and thereby fixing the baffle 20 onto the connector 10.

As discussed, mating the first engagement structure 15 of the connector 10 to the second engagement structure 25 of the baffle 20 can be achieved by simply placing the baffle 20 along a direction being substantially perpendicular to the extension direction D1 onto the connector 10, that is, the installation of the baffle 20 to the connector 10 can be efficiently realized without any additional hand tool. Also, since the first engagement structures 15 extend outwardly from two opposite ends of the base part 11 of the connector 10 along the extension direction D1, the interval between the connectors 10 is irrelevant to the engagement between the baffle 20 and the connector 10, thus the baffle 20 is implementable on the connectors 10 while the connectors 10 are arranged in a compact manner.

Optionally, the baffle 20 may further include at least one positioning portion 27 protruding from a surface of the extension portion 23 facing the connector 10. In specific, the positioning portion 27 is, for example, a protrusion protruding from a side (or, surface) of the extension portion 23 facing the base part 11 of the connector 10 along a direction substantially perpendicular to the extension direction D1, and the positioning portion 27 is located closer to the main portion 21 than the second engagement structure 25. During the installation of the baffle 20 onto the connector 10, the positioning portion 27 help position the baffle 20 relative to the connector 10.

In addition, when the baffle 20 is installed on the connector 10, the second engagement portion 253 of the second engagement structure 25 is partially exposed from the first engagement portion 153 and therefore the baffle 20 is selectively removable from the first engagement portion 153 by being pushed by user's finger.

Further, since the first engagement structure 15 which is used to engage with the second engagement structure 25 of the baffle 20 does not interfere with the motion of the latch 13, the latch 13 is still functional and not affected by the baffle 20.

The previous exemplary embodiments are not intended to limit the disclosure and may be further modified as required. For example, please refer to FIGS. 8-11, another embodiment of the disclosure provides a connector assembly 1' and an electronic device 9' including the same. For the simple illustration, only the main differences between the previous embodiments and following embodiment will be described in detail, and the similar parts between these embodiments may be omitted hereinafter.

As shown, in a connector 10' of the connector assembly 1', receiving portion 151' of a first engagement structure 15' is, for example, a through hole connected to a first engagement portion 153' of the receiving portion 151' and located between the receiving portion 151' and the circuit board P. Correspondingly, a second engagement structure 25' of the baffle 20' includes a second connection portion 252 protruding from the first connection portion 251. For example, the second connection portion 252 may protrude from a surface of the first connection portion 251 facing the circuit board P and perpendicular to the first connection portion 251, a second engagement portion 253' is connected to the first connection portion 251 via the second connection portion 252; in other words, the second connection portion 252 is connected between the second engagement portion 253' and the first connection portion 251. An inclined push surface 2531' of the second engagement portion 253' is located at a side of the second engagement portion 253' located relatively close to the circuit board P and inclined relative to the extension direction D1 of the slot 111, and an engaging surface 2533' of the second engagement portion 253' is located at a side of the second engagement portion 253' located relatively away from the circuit board P and inclined relative to the inclined push surface 2531'.

Figure 10:
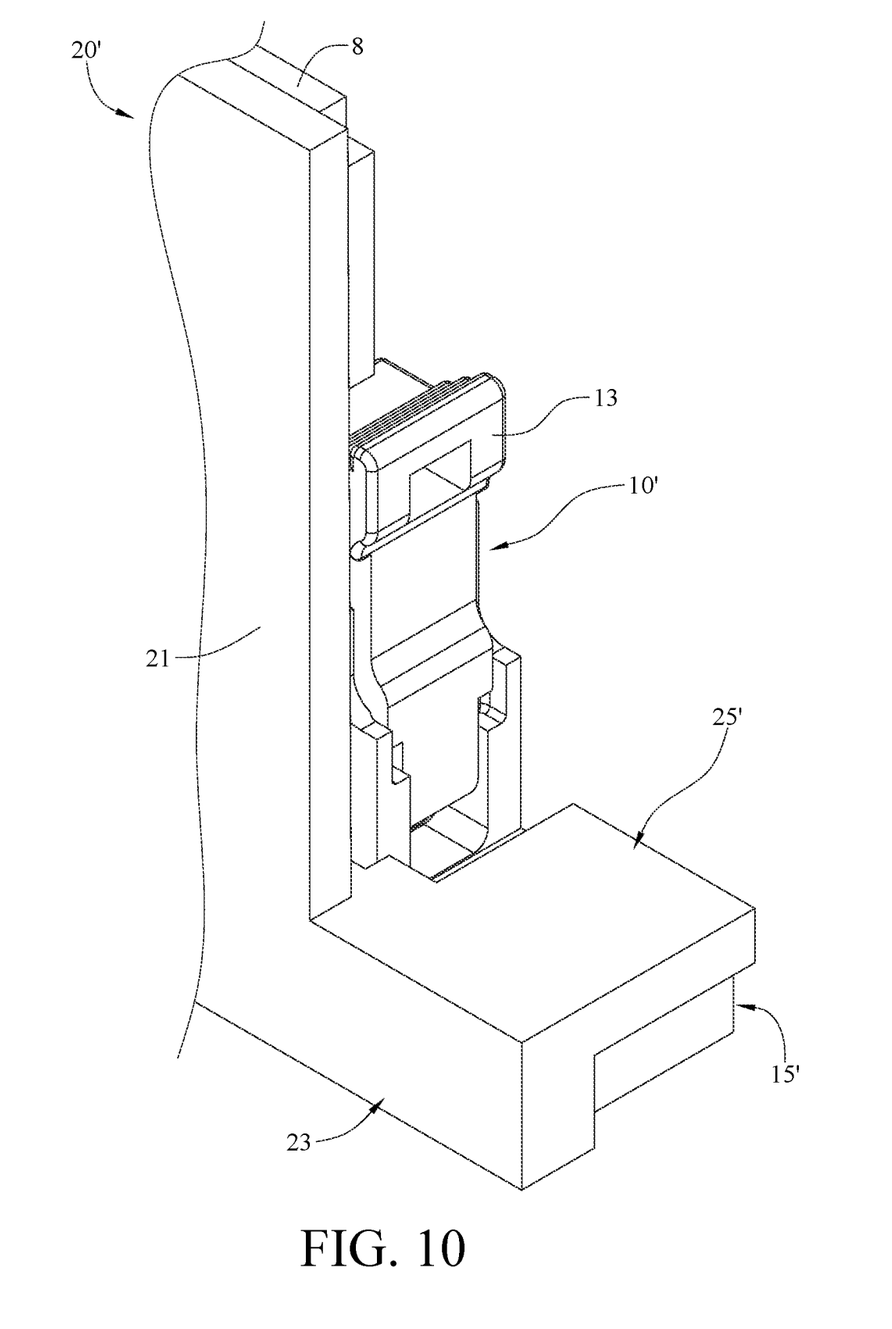
FIG. 10 is a partially enlarged view showing that a baffle according to another embodiment of the disclosure is installed on a connector.
Figure 11:
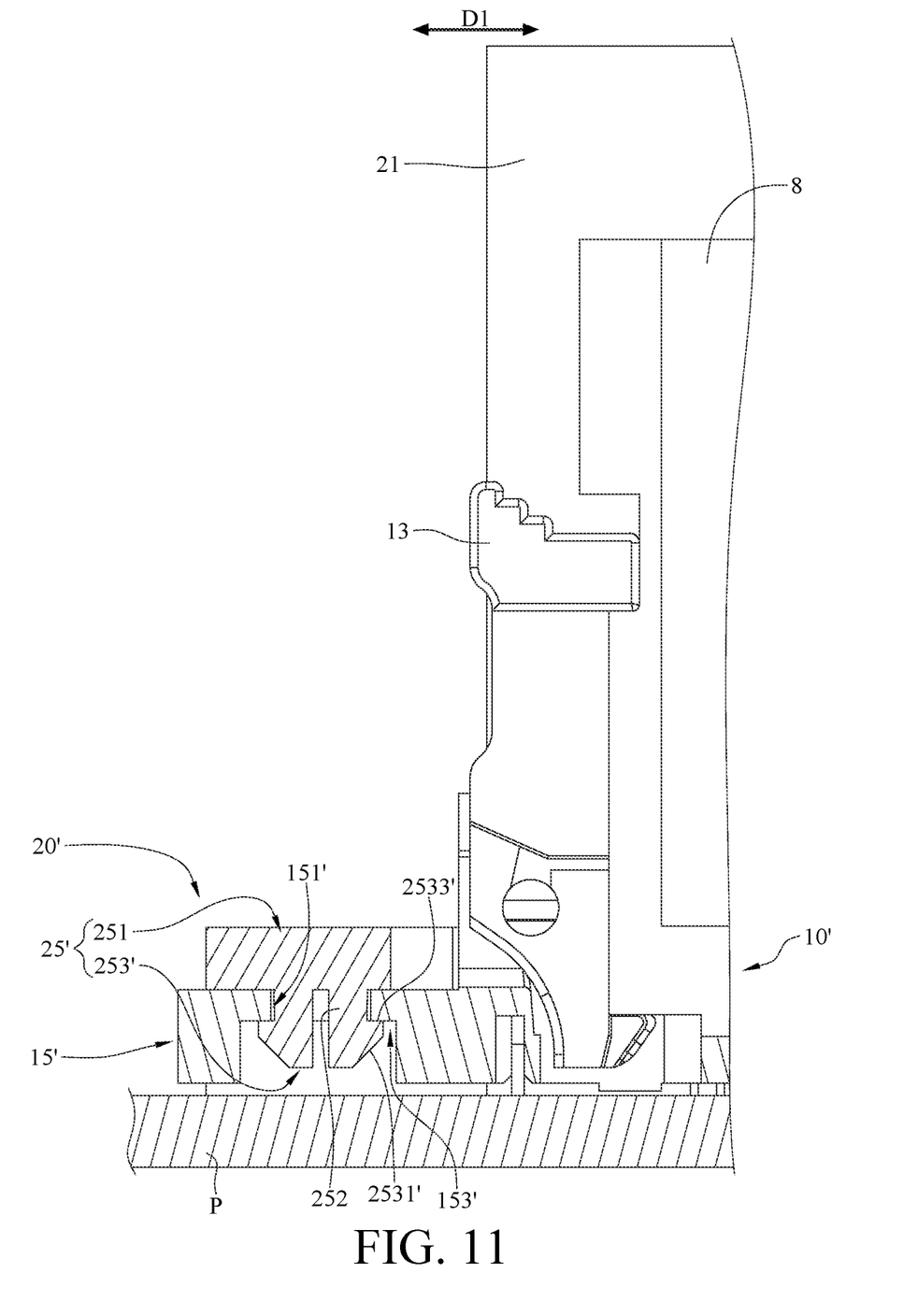
FIG. 11 is a partially enlarged cross-sectional view of the baffle and connector in FIG. 10.

In such an arrangement, the installation of the baffle 20' to the connector 10' can be achieved simply by placing the baffle 20' toward the circuit board P. Similar to the previous embodiment, during the placement of the baffle 20' to the connector 10', the inclined push surface 2531' contacts the inner wall of the receiving portion 151' to guide the second engagement portion 253' to enter the receiving portion 151'. As the baffle 20 move further close to the circuit board P along a direction perpendicular to the extension direction D1, the engaging surface 2533' of the second engagement portion 253' enters the first engagement portion 153' and engages with the inner wall of the first engagement portion 153'. By doing so, the second engagement structure 25' retains the first engagement structure 15' so as to fix the baffle 20' on the connector 10'. It is noted that the installation and removal of the baffle 20' are achieved by moving toward or away from the circuit board P and therefore do not affect or limit the available area for other components nearby the connector 10.

The previous embodiments may be further modified as required. For example, in another embodiment, the engagement between the connector and the baffle may be achieved only by a single set of first engagement structure and second engagement structure; alternatively, in another embodiment, at least part of the first engagement structure and at least part of the second engagement structure may magnetically attract to each other, thus the baffle and the connector may be engaged with each other via magnetic force.

According to the connector assembly and the electronic device as discussed in the above embodiments of the disclosure, the first engagement structure on the connector of the connector assembly is selectively engaged with the second engagement structure of the baffle, thus the installation of the baffle can be achieved simply by placing the baffle onto the connector without additional hand tool and thereby improving the assembling efficiency.

Also, the connector of the connector assembly of the disclosure not only can secure the expansion card but also can secure the baffle, that is, the baffle is installed on the connector, such that the installation of the baffle of the disclosure can be achieved without relying on mount holes on the circuit board; in other words, the circuit board has no need to have additional mount holes for the connector assembly of the disclosure and thereby avoiding limiting the available area on the circuit board for circuits and traces.

In addition, the first engagement structure of the connector and the second engagement structure of the baffle do not interfere with the latches and therefore the latches are still functional when the baffle is installed on the connector.

In such an arrangement, the baffle is selectively installed on the selected connector in a simple and efficient manner to define an air channel for cooling air to pass through the expansion cards. And since the baffle may be arranged at the outer side of the outermost expansion card, the baffle can protect the expansion card from being hit or damaged by nearby electrical/non-electrical component (e.g., cable).

In addition, the second engagement structure on the baffle used to engage with the first engagement structure on the connector is extending outwardly from the base part along the extension direction of the slot, thus the interval between the connectors is irrelevant to the engagement between the baffle and the connector, so that the baffle is implementable on the connectors while the connectors are arranged in a compact manner.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A connector assembly, comprising:
a connector comprising a base part, two latches, and a first engagement structure, wherein the two latches are respectively disposed at two opposite ends of the base part, and the first engagement structure extends outwardly along an extension direction from the base part; and
a baffle comprising a main portion and a second engagement structure connected to the main portion, the second engagement structure extends outwardly from the main portion along a direction perpendicular to the extension direction;

wherein the second engagement structure is disposed in the first engagement structure to fix the baffle on the connector.

2. The connector assembly according to claim 1, wherein the first engagement structure is integrally formed with the base part.

3. The connector assembly according to claim 1, wherein the base part has a slot extending along an extension direction, the first engagement structure extends outwardly from a side of the base part located away from the slot along the extension direction.

4. The connector assembly according to claim 3, wherein the baffle comprises an extension portion which extends outwardly from a side of the main portion along the extension direction, the second engagement structure protrudes from a side of the extension portion facing the connector.

5. The connector assembly according to claim 4, wherein the second engagement structure comprises a first connection portion and a second engagement portion, the first connection portion extends towards the first engagement structure from the extension portion, the second engagement portion extends away from the main portion from the first connection portion along the extension direction.

6. The connector assembly according to claim 5, wherein the second engagement portion comprises an inclined push surface and an engaging surface located opposite to each other, the inclined push surface is inclined relative to the extension direction, and the engaging surface is parallel to the extension direction.

7. The connector assembly according to claim 6, wherein the first engagement structure comprises a receiving portion and a first engagement portion connected to each other, the second engagement structure partially penetrates through the receiving portion and the engaging surface engages with an inner wall of the first engagement portion.

8. The connector assembly according to claim 4, wherein the baffle further comprises a positioning portion protruding from a surface of the extension portion facing the connector, the positioning portion is located closer to the main portion than the second engagement structure.

9. The connector assembly according to claim 4, wherein the second engagement structure comprises a first connection portion, a second connection portion, and a second engagement portion, the first connection portion extends toward the first engagement structure from the extension portion, the second engagement portion protrudes from the second connection portion and an engaging surface of the second engagement portion is parallel to the extension direction, the second connection portion is connected between the first connection portion and the second engagement portion.

10. An electronic device comprising:
a device casing;
a circuit board accommodated in the device casing; and
a connector assembly comprising:
a connector comprising a base part, two latches, and a first engagement structure, wherein the base part is disposed on the circuit board, the two latches are respectively disposed at two opposite ends of the base part, and the first engagement structure extends outwardly along an extension direction from the base part; and
a baffle comprising a main portion and a second engagement structure connected to the main portion, the second engagement structure extends outwardly from the main portion along a direction perpendicular to the extension direction;
wherein the second engagement structure is disposed in the first engagement structure to fix the baffle on the connector.

11. The electronic device according to claim 10, wherein the first engagement structure is integrally formed with the base part.

12. The electronic device according to claim 10, wherein the base part has a slot extending along an extension direction, the first engagement structure extends outwardly from a side of the base part located away from the slot along the extension direction.

13. The electronic device according to claim 12, wherein the baffle comprises an extension portion which extends outwardly from a side of the main portion along the extension direction, the second engagement structure protrudes from a side of the extension portion facing the connector.

14. The electronic device according to claim 13, wherein the second engagement structure comprises a first connection portion and a second engagement portion, the first connection portion extends towards the first engagement structure from the extension portion, the second engagement portion extends away from the main portion from the first connection portion along the extension direction.

15. The electronic device according to claim 14, wherein the second engagement portion comprises an inclined push surface and an engaging surface located opposite to each other, the inclined push surface is inclined relative to the extension direction, and the engaging surface is parallel to the extension direction.

16. The electronic device according to claim 15, wherein the first engagement structure comprises a receiving portion and a first engagement portion connected to each other, the second engagement structure partially penetrates through the receiving portion and the engaging surface engages with an inner wall of the first engagement portion.

17. The electronic device according to claim 13, wherein the baffle further comprises a positioning portion protruding from a surface of the extension portion facing the connector, the positioning portion is located closer to the main portion than the second engagement structure.

18. The electronic device according to claim 13, wherein the second engagement structure comprises a first connection portion, a second connection portion, and a second engagement portion, the first connection portion extends toward the first engagement structure from the extension portion, the second engagement portion protrudes from the second connection portion and an engaging surface of the second engagement portion is parallel to the extension direction, the second connection portion is connected between the first connection portion and the second engagement portion.

19. The electronic device according to claim 10, wherein the first engagement structure is located between the latches and the circuit board.

20. The electronic device according to claim 10, further comprising an expansion card plugged into the connector assembly, the expansion card is electrically connected to the circuit board via the connector assembly.

* * * * *